(12) United States Patent
Nasman et al.

(10) Patent No.: US 7,133,921 B2
(45) Date of Patent: Nov. 7, 2006

(54) PORTABLE DEVICES FOR DIFFERENT CONTROL INTERFACES

(75) Inventors: Kevin P. Nasman, North Chili, NY (US); Daniel J. Vona, Jr., Rochester, NY (US)

(73) Assignee: MKS Instruments, Inc., Wilmington, MA (US)

( * ) Notice: Subject to any disclaimer, the term of this patent is extended or adjusted under 35 U.S.C. 154(b) by 802 days.

(21) Appl. No.: 09/827,519

(22) Filed: Apr. 6, 2001

(65) Prior Publication Data

US 2002/0147852 A1    Oct. 10, 2002

(51) Int. Cl.
  G06F 15/16    (2006.01)
  H02H 3/00    (2006.01)
  H04M 1/00    (2006.01)

(52) U.S. Cl. ............... 709/230; 709/250; 709/251; 361/62; 455/552.1

(58) Field of Classification Search .......... 709/203, 709/214, 216, 250, 251, 230–232; 707/101; 361/62, 661, 728; 455/552.1, 73, 74.1, 11.1, 455/552–553, 103, 132, 20–22
See application file for complete search history.

(56) References Cited

U.S. PATENT DOCUMENTS

| | | | | |
|---|---|---|---|---|
| 4,375,051 A * | 2/1983 | Theall | ................ | 333/17.3 |
| 4,882,754 A * | 11/1989 | Weaver et al. | ............... | 704/201 |
| 5,195,045 A * | 3/1993 | Keane et al. | ................ | 702/107 |
| 5,614,813 A * | 3/1997 | Batson | ................ | 323/283 |
| 5,831,479 A * | 11/1998 | Leffel et al. | ............ | 330/124 D |
| 5,832,207 A * | 11/1998 | Little et al. | ................. | 713/200 |
| 5,867,060 A * | 2/1999 | Burkett et al. | ................. | 330/2 |
| 5,953,503 A * | 9/1999 | Mitzenmacher et al. | .... | 709/203 |
| 6,052,120 A * | 4/2000 | Nahi et al. | ................... | 345/700 |
| 6,128,673 A * | 10/2000 | Aronson et al. | ............. | 710/22 |
| 6,131,125 A * | 10/2000 | Rostoker et al. | ............ | 709/250 |
| 6,222,718 B1 * | 4/2001 | Dible | ........................ | 361/234 |
| 6,269,252 B1 * | 7/2001 | Hutchings et al. | ....... | 455/552.1 |
| 6,359,250 B1 * | 3/2002 | Blonigan et al. | ...... | 219/121.43 |
| 6,446,177 B1 * | 9/2002 | Tanaka et al. | ............. | 711/163 |
| 6,601,115 B1 * | 7/2003 | Yonezawa et al. | ............ | 710/11 |

* cited by examiner

*Primary Examiner*—Thomas Pham
(74) *Attorney, Agent, or Firm*—Harness, Dickey & Pierce, P.L.C.

(57) ABSTRACT

A communications interface system and method for a plasma generator is provided. The communications interface system includes a power delivery system component that has a standard POD interface for communicating information that complies with a first protocol. A portable device is coupled between the standard POD interface and a second communication interface for communicating information therebetween. The second communication interface communicates information in a format that complies with a second protocol. The portable device is detachable from the standard POD interface and the second communication interface. A first communication link couples the standard POD interface to the portable device. A second communication link couples the portable device to the second communication interface.

17 Claims, 5 Drawing Sheets

PORTABLE DEVICES FOR DIFFERENT CONTROL INTERFACES

FIELD OF THE INVENTION

The present invention relates to power generation devices and in particular to communication interfaces for power generation devices.

BACKGROUND OF THE INVENTION

Material processing, such as plasma deposition and sputtering, through the utilization of plasmas has been known for many years. These processes generally employ a generator to provide either an RF or high voltage DC power signal that is coupled to a plasma chamber. Conventional generators typically include a custom data communication system for transmitting signals between internal and external assemblies. Referring to FIG. 1, a conventional generator 10a having a custom data communication system is shown. The data communication system generally employs a mixture of analog/digital signals for internal communications between system assemblies and a custom interface 12 for communications between the generator and the customer.

Referring to FIG. 2, another communication link configuration for communications between a generator 10b and customer includes the multiproduct configuration in which the generator 10b has both a custom interface 14 and a separate multiproduct interface 16. The custom interface 14 supports communications between the customer and the generator 10b, while the multiproduct interface 16 supports communications between the generator 10b and a variety of different products. The multiproduct configuration typically includes a control system 17 for coordinating communications flowing through the custom 14 and multiproduct 16 interfaces.

Referring to FIG. 3, a third conventional communication link configuration for a generator 10c is shown. The communication link includes a coprocessor within a custom multiprocessor control system 18 to provide enhanced control of communications through the custom interface 20. The coprocessor coordinates the flow of information from the generator through the custom interface 20.

Each of these configurations shares several drawbacks including inaccessibility for upgrading and servicing the interface, reduced interface choices for the customer, and the high cost of producing and maintaining customized versions of the generator to support different interface standards.

SUMMARY OF THE INVENTION

A communications interface system and method for a plasma generator is provided. The communications interface system includes a generator assembly that has a standard portable device (POD) interface for communicating information that complies with a first protocol. A portable device is coupled between the standard POD interface and a second communication interface for communicating information therebetween. The second communication interface communicates information in a format that complies with a second protocol. The portable device is detachable from the standard POD interface and the second communication interface. A first communication link couples the standard POD interface to the portable device. A second communication link couples the portable device to the second communication interface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
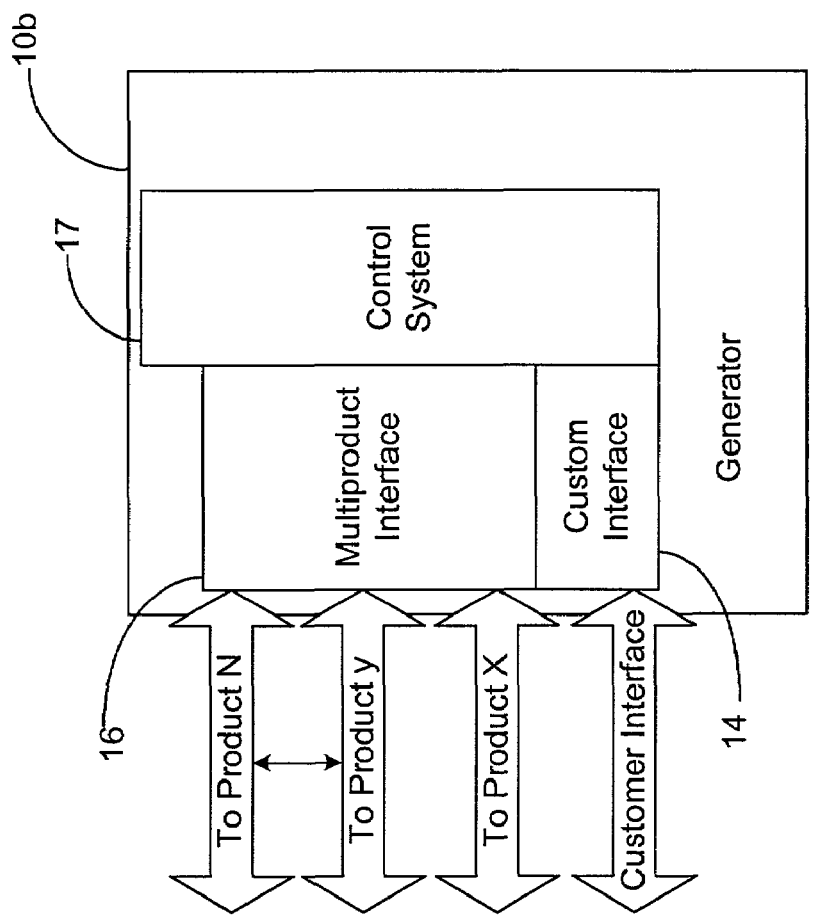
FIG. 2 illustrates a block diagram of a second conventional generator communication link configuration.
Figure 1:
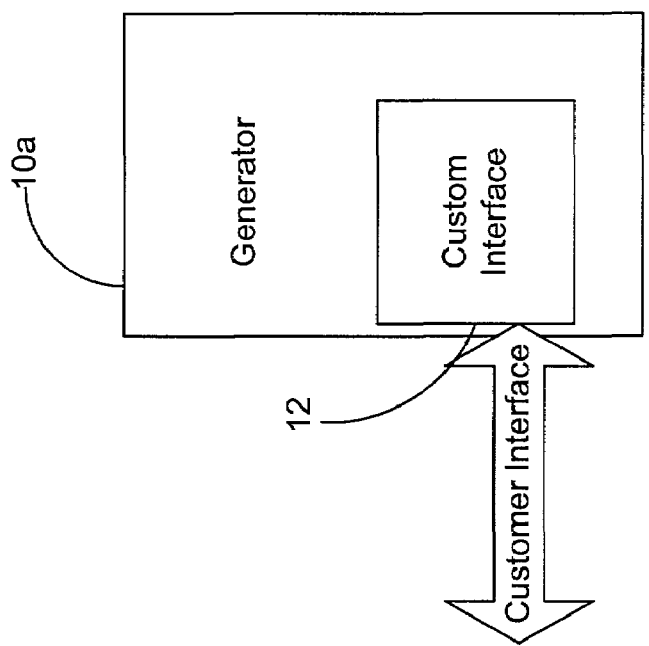
FIG. 1 illustrates a block diagram of a first conventional generator communication link configuration.
Figure 3:
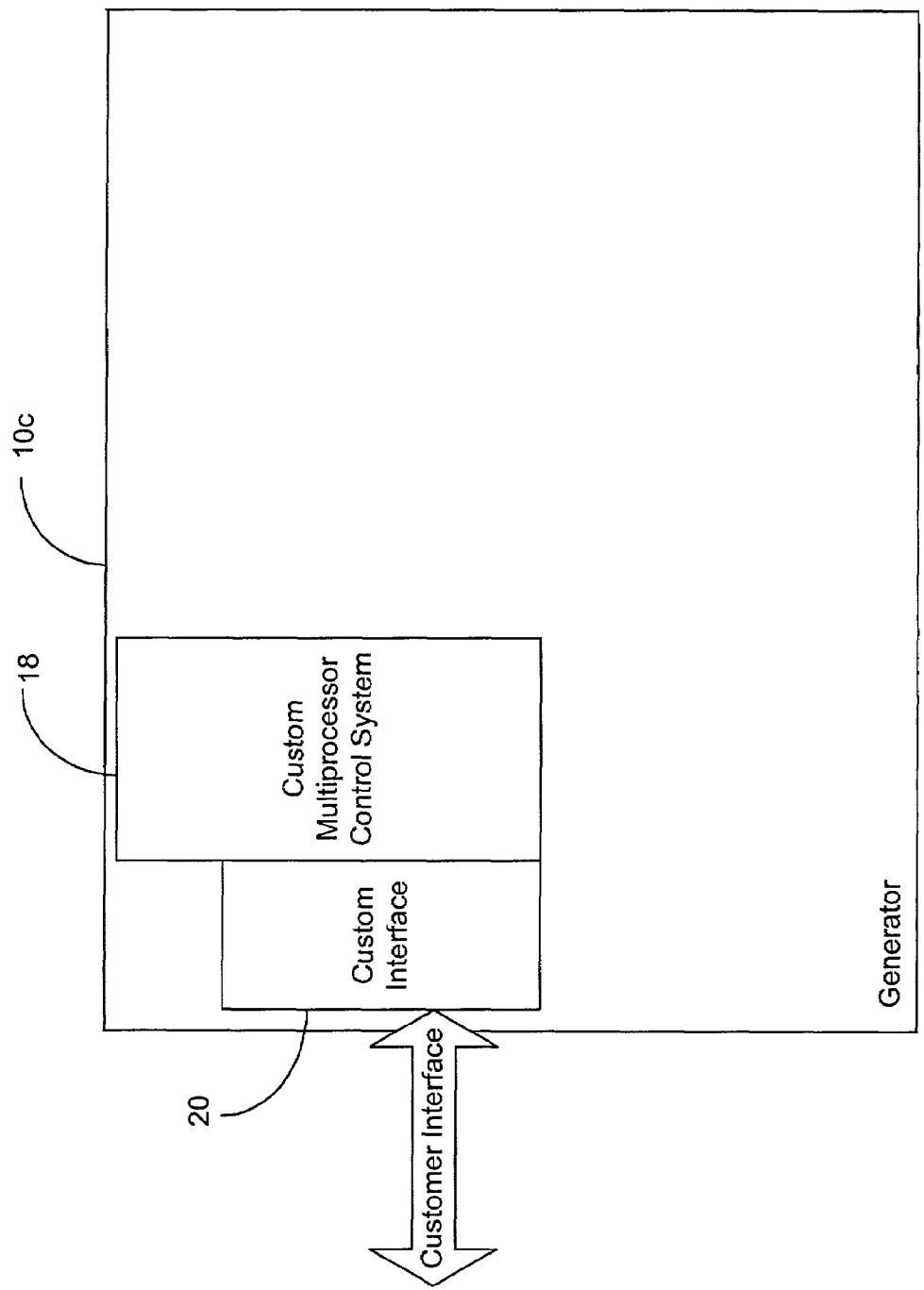
FIG. 3 illustrates a block diagram of a third conventional generator communication link configuration.
Figure 4:
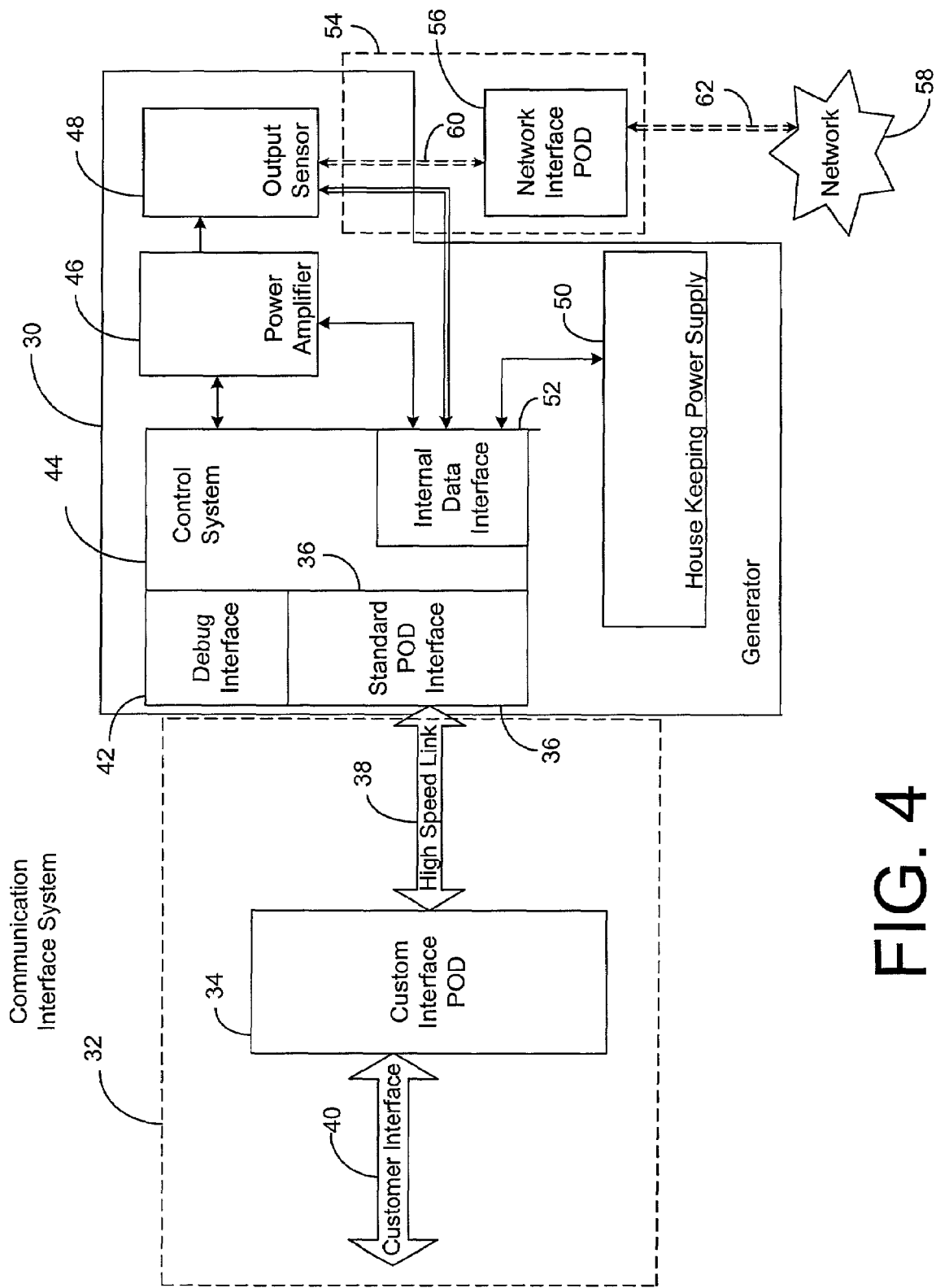
FIG. 4 illustrates a block diagram of a first embodiment of a portable device communication link in accordance with the teachings of the present invention.

Referring to FIG. 4, illustrated is a block diagram of a presently preferred embodiment of a generator 30 interconnected to a communications interface system 32 in accordance with the principles of the invention. Although, the communications interface system is preferably used in conjunction with a generator, the scope of the invention includes interfacing to other power delivery system components in addition to generators, such as matching networks, V/I probes, output sensors, and power amplifiers. The communications interface system 32 comprises a custom interface POD 34 coupled between a standard POD interface 36 and a custom interface (not shown) via a pair of communication links 38 and 40. The custom interface POD 34 is one version of an unlimited variety of interface PODs that are used to facilitate communication between generators that have a generic interface protocol such as the standard POD interface protocol, and another interface based on a different communication protocol such as AnyBus, Ethernet, Devicenet, and Analog Interface.

The generator 30 uses only the generic interface protocol as the standard for communicating with other assemblies and devices. There are not different versions of the generator 30 for communicating with interfaces based on a different protocol. Essentially, the communications interface system 32 shifts the interface adapting mechanism outside of the generator 30, into the interface PODs which are separate from the generator 30. For example, in the presently preferred embodiment the standard POD interface protocol is used for all of the generators. To interface the generator 30 to a device that uses a different protocol such as Devicenet, a Devicenet interface POD is coupled between the generator 30 and the Devicenet device. Likewise, to interface the generator 30 to a device that uses Ethernet, an Ethernet interface POD is coupled between the generator 30 and the Ethernet device. In each case, the interface POD interfaces the generic interface of the generator 30 to a different interface protocol. By shifting the interfacing function into the interface POD, several advantages are gained. For example, upgrading and servicing the interface is enhanced since the interface is accessible, the generator is easily interfaced to several different interfaces merely by selecting a corresponding interface POD, and the additional cost associated with producing and maintaining customized versions of the generator to support different interface standards is eliminated.

In addition to interfacing the generator 30 to another device (not shown), the communication interface system may be used to interface other generator assemblies to internal generator assemblies or external devices. Generator assemblies include power amplifiers, V/I probes, output sensors, control assemblies, and internal power supplies. Before describing further embodiments of the communication interface system, it is necessary to describe the interconnection of the assemblies of the generator 30. The generator 30 includes a debug interface 42 for maintenance and initial system test. A control system 44 coordinates the operation of the generator 30 including output regulation and communication with external devices. Drive signals from the control system 44 are coupled to a power amplifier 46 that generates the power output. An output sensor 48 senses signal characteristics of the power output. A housekeeping power supply 50 provides regulated power for the assemblies of the generator 30. An internal data interface 52 coordinates communication between the power amplifier 46, output sensor 48, and housekeeping power supply 50.

Continuing to refer to FIG. 4, a second embodiment of a communication interface system 54 is illustrated. The output sensor 48 of the generator 30 includes a standard POD interface (not shown) that is coupled through a network interface POD 56 to a network 58. Communications from the output sensor 48 flow through a high speed link 60 to the network interface POD 56, and then through another link 62 to the network 58. Generally, if the output sensor 48 is an assembly of a generator that includes a standard POD interface 36, communications from the output sensor 48 are routed through the standard POD interface 36 of the generator 30. However, if the associated generator does not include a standard POD interface 36, then routing communications through a network interface POD 56 as described for the communication interface system 54 is preferred. As in the previous embodiment, the network interface POD 56 is separate from the generator 30 to facilitate accessibility, flexibility in selecting interfaces, upgradability, lower cost of production, and improved maintainability.

Figure 5:
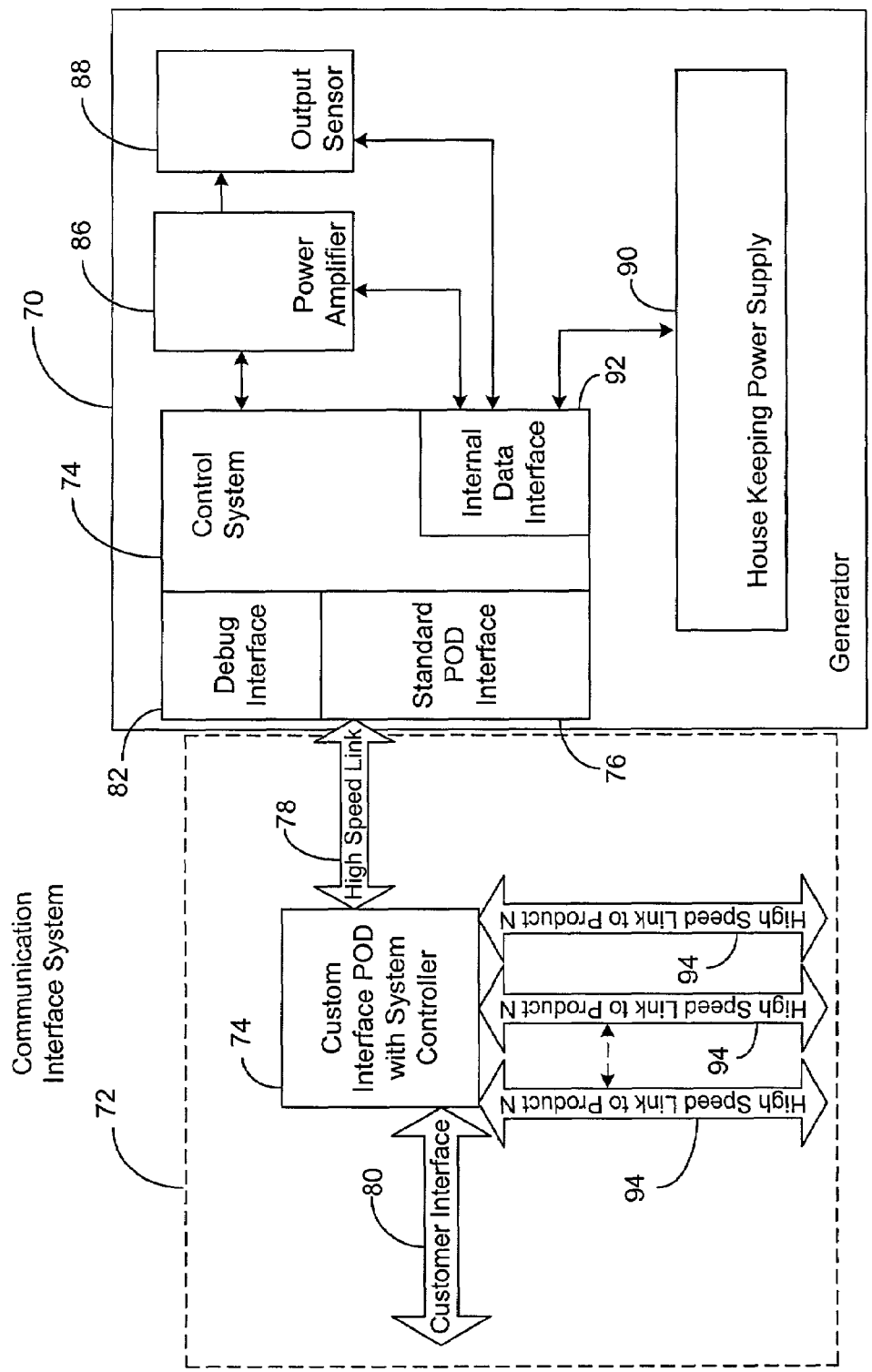
FIG. 5 illustrates a block diagram of a second embodiment of a portable device communication link in accordance with the teachings of the present invention.

Referring to FIG. 5, a second embodiment of a communication interface system 72 coupled to a generator 70 is shown. The combination of communication interface system 72 and generator 70 is similar to the combination of communication interface system 32 and generator 30 in function with corresponding elements numbered in the range 70–99, except that communication interface system 72 includes additional communication links 94 for interfacing to multiple devices such as generators, generator assemblies, and networks. In addition, a system controller is included in the custom interface POD 74 to co-ordinate the interaction of the communication links 78, 80, and 94.

Figure 6:
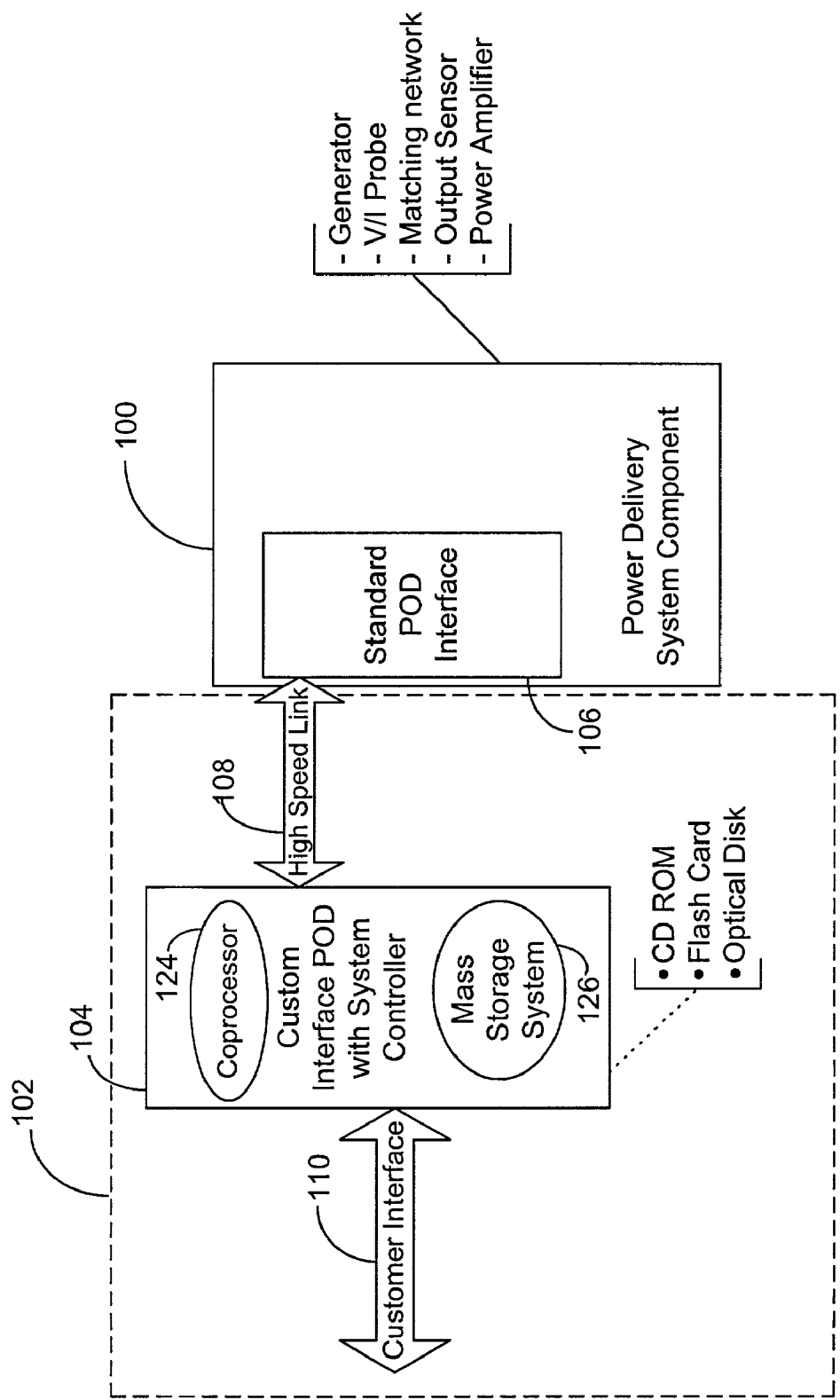
FIG. 6 illustrates a block diagram of a third embodiment of a portable device communication link in accordance with the teachings of the present invention.

Referring to FIG. 6, a third embodiment of a communication interface system 102 coupled to a power delivery system component 100 is shown. The combination of communication interface system 102 and power delivery system component 100 is similar to the combination of communication interface system 32 and generator 30 in function, with corresponding elements numbered in the range 100–122, except that interface POD 104 includes a coprocessor 124 to support interfaces having higher speeds and increased functionality. The interface POD 104 also includes a mass storage system 126 either alone or combination with the co-processor 124. The scope of the invention includes mass storage systems that use storage devices such as flash cards, writable CD-ROM, writable optical disks, and magnetic media.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A communications interface system for communicating information in a plasma processing system, comprising:
   a power delivery system component including a POD interface for communicating information that complies with a first protocol;
   a portable device including a coprocessor and a mass storage device selected from the group of CD-ROMs, FlashCards, Optical Disks, and magnetic media, coupled between the POD interface and a second communication interface for communicating sensor information there between, the second communication interface communicating sensor informationing that complies with a second protocol, the portable device translating the sensor information between the first protocol and the second protocol and being detachable from the POD interface and the second communication interface;
   a first communication link for coupling the POD interface to the portable device; and
   a second communication link for coupling the portable device to the second communication interface.

2. The communications interface system of claim 1 wherein the second protocol is selected from the group of analog interface, USB, Ethernet, Devicenet, Profibus, Modbus, and Infrared Transceiver.

3. The communications interface system of claim 1 wherein the portable device includes a plurality of interface ports for interfacing with more than one communication interface.

4. The communications interface system of claim 1 wherein the portable device further includes a coprocessor.

5. The communications interface system of claim 1 wherein the second communication interface is a customer interface.

6. The communications interface system of claim 1 wherein the power delivery system component is selected from the group of V/I probes, generators, matching networks, and power amplifiers.

7. A communications interface system for a plasma generator system, comprising:
   a power delivery system component including a POD interface for communicating sensor information that complies with a first protocol;
   a portable device including a coprocessor and a mass storage device selected from the group of CD-ROMs, FlashCards, Optical Disks, and magnetic media, coupled between the POD interface and a customer communication interface for communicating sensor information there between, the customer communication interface communicating sensor information that complies with a second protocol, the portable device translating the sensor information between the first protocol and the second protocol and being detachable from the POD interface and the customer communication interface;

a first communication link for coupling the POD interface to the portable device; and a second communication link for coupling the portable device to the customer communication interface.

8. The communications interface system of claim 7 wherein the portable device further includes a coprocessor.

9. The communications interface system of claim 8 wherein the portable device includes a plurality of interface ports for interfacing with more than one communication interface.

10. The communications interface system of claim 9 wherein the power delivery system component is selected from the group of V/I probes, generators, matching networks, and power amplifiers.

11. A communications interface system for communicating information in a plasma processing system, comprising:

a generator assembly including a POD interface conforming to a first protocol for communicating information, the POD interface including a communication port for receiving communication signals;

a first communication link having a first end detachably coupled to the POD interface communication port;

an interface portable device including a coprocessor and a mass storage device selected from the group of CD-ROMs, FlashCards, Optical Disks, and magnetic media, detachably coupled between the POD interface and a second communication interface for communicating information there between, the second communication interface conforming to a second protocol, the interface portable device converting information flowing between the POD interface and the second communication interface such that information flowing to the second communication interface conforms to the second protocol and sensor information flowing to the POD interface conforms to the first protocol; and a second communication link for detachably coupling the portable device to the second communication interface.

12. The communications interface system of claim 11 wherein the portable device includes a plurality of interface ports for interfacing with more than one communication interface.

13. A plasma processing system that connects to a selected one of a plurality of types of interfaces and that communicates using a selected one of a plurality of protocols, comprising:

a power delivery system component further comprising:
  a sensor that provides sensor data;
  a control system; and
  a POD interface that communicates the sensor data using a first protocol and that is in communication with the control system; and a plurality of portable devices, wherein each one of the portable devices can connect between the POD interface and only one of the plurality of types of interfaces and is adapted to translate the sensor data between the first protocol and only one of the plurality of protocols, wherein a selected one of the portable devices connects between the POD interface and the selected one of the plurality of types of interfaces to communicate the sensor data between the first protocol of the power delivery system and the selected one of the plurality of protocols.

14. The plasma processing system of claim 13 wherein each of the plurality of portable devices further includes a mass storage device selected from a group consisting of CD-ROMs, FlashCards, Optical Disks, and magnetic media.

15. The plasma processing system of claim 13 wherein each of the plurality of portable devices further includes a coprocessor.

16. The plasma processing system of claim 13 wherein each of the plurality of portable devices includes a plurality of interface ports that communicate using the first protocol.

17. The plasma processing system of claim 13 wherein the power delivery system component is selected from a group consisting of V/I probes, generators, matching networks, and power amplifiers.

* * * * *